United States Patent [19]

Oliver et al.

[11] Patent Number: 5,611,514

[45] Date of Patent: Mar. 18, 1997

[54] ADJUSTABLE PIPE PIER

[76] Inventors: James Oliver; Evon L. Oliver, both of 1990-D McCulloch Blvd. #110, Lake Havasu City, Ariz. 86403

[21] Appl. No.: 502,133

[22] Filed: Jul. 13, 1995

[51] Int. Cl.⁶ .................................................. E04G 25/00
[52] U.S. Cl. ........................ 248/357; 52/126.1; 52/126.6; 405/288
[58] Field of Search ..................................... 248/357, 351, 248/352, 354.1, 354.6, 354.7, 122.1, 412, 178.1; 52/126.1, 126.3, 126.6; 405/288, 290

[56] References Cited

U.S. PATENT DOCUMENTS

| | | | |
|---|---|---|---|
| 4,021,012 | 5/1977 | Miller | 248/354.6 X |
| 4,135,335 | 1/1979 | Jensen | 52/126.1 |
| 4,625,489 | 12/1986 | Bogle | 52/126.1 X |
| 4,937,989 | 7/1990 | Miyares et al. | 52/126.6 X |
| 5,490,656 | 2/1996 | Frisby | 248/357 X |

*Primary Examiner*—Ramon O. Ramirez
*Attorney, Agent, or Firm*—Calif Tervo

[57] ABSTRACT

A pier (10) for supporting an object, such as a mobile home coach frame, above the ground generally comprises support (80) supporting pipe (70) in a vertical position and against downward movement, platform (30) having a sloped upper surface (43) supported by top end (71) of pipe (70), and wedge (50) supported by platform (30); wedge (50) having slanted bottom (53) and horizontal top surface (60) for supporting the load. The height of pier (10) can be adjusted by sliding wedge (50) up sloped surface (43). Gripping ridges (45,55) on slope (43) and slanted bottom (53) interact so that the wedge (50) may not slide down the slope (43). Platform (30) includes a plurality of receptacles (40) for receiving top end (71) of pipe (70) for supporting sloped surface (43) at various heights.

18 Claims, 2 Drawing Sheets

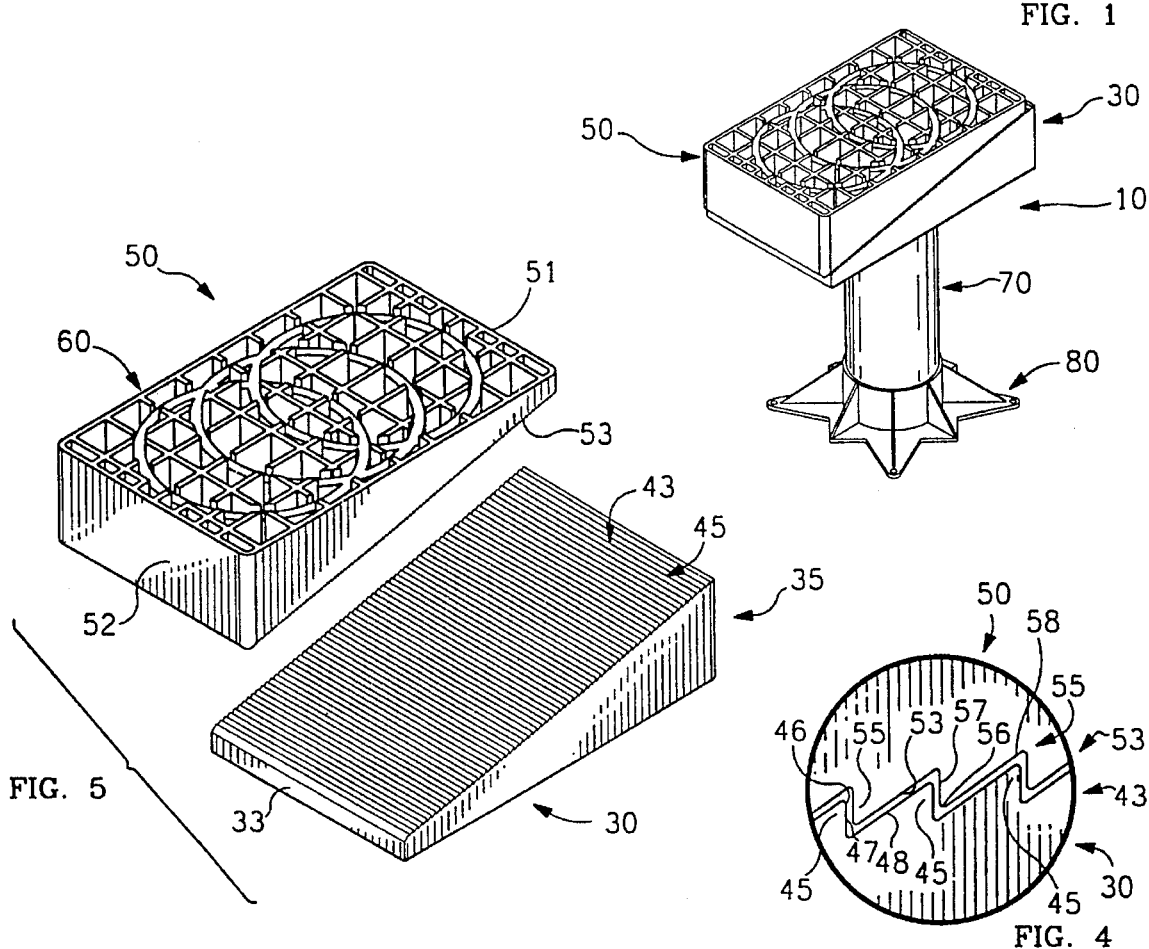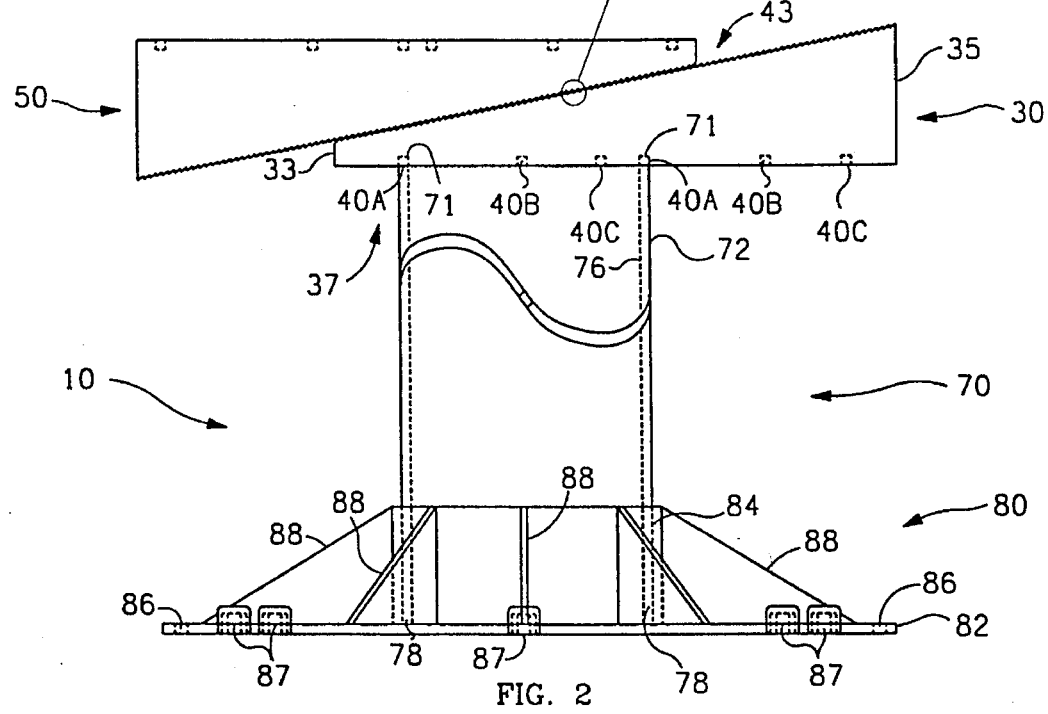

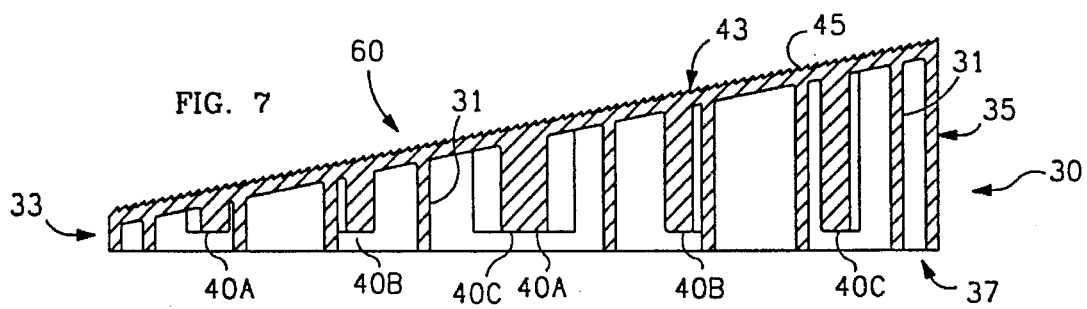
FIG. 7
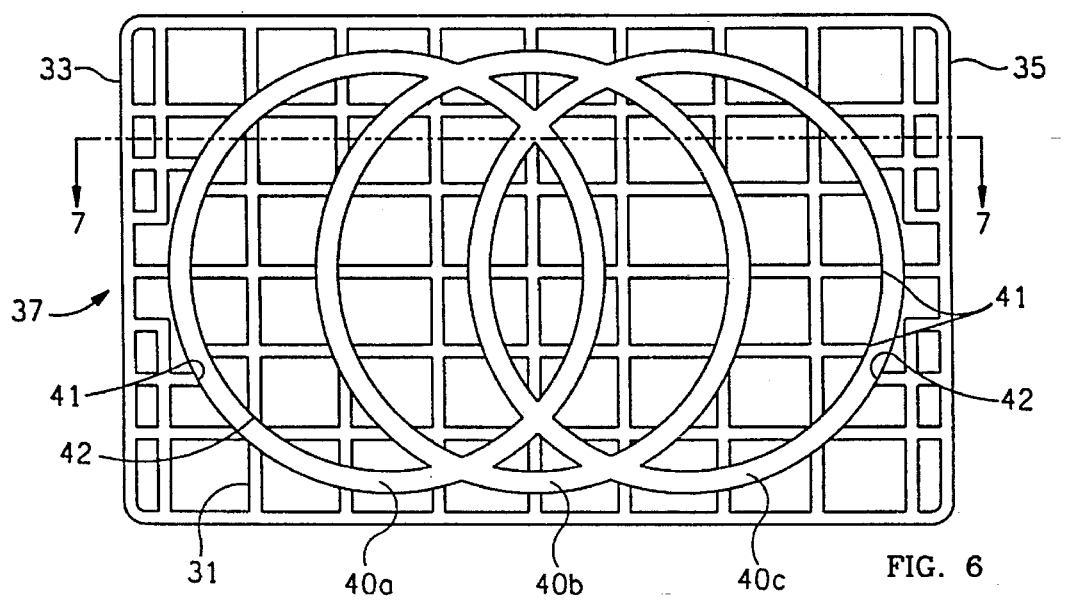
FIG. 6
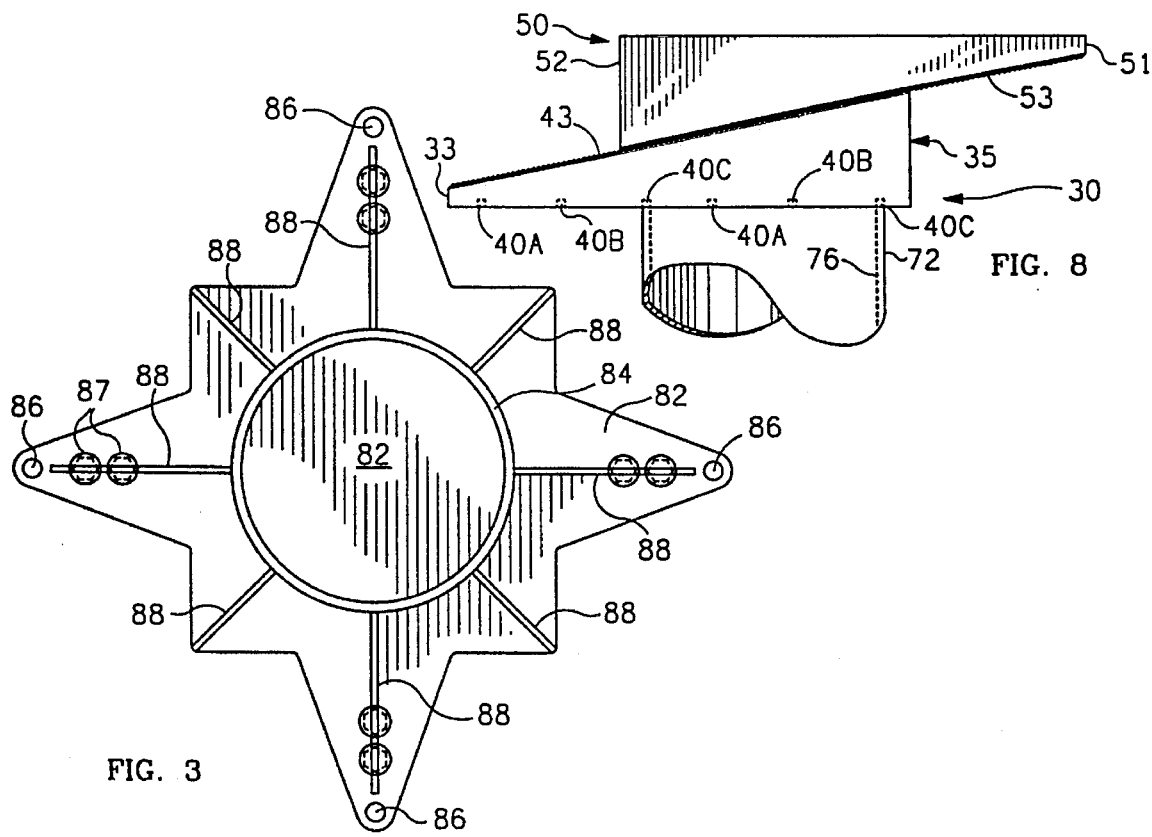
FIG. 8
FIG. 3

ADJUSTABLE PIPE PIER

BACKGROUND OF THE INVENTION

1. Field of the Invention

This invention relates in general to piers for supporting an object, such as a mobile home coach, and more specifically involves a pier whose total height is exceptionally easily created and adjusted in the field.

2. Background of the Invention

A mobile home is moved to a site and then is supported in place by a significant number of piers. Piers are rather uniformly spaced supporting the floor by supporting the exterior and interior support beams. The top of the piers must support the home so that the floor is level and provide resistance to shear forces, such as those generated during an earthquake. Also, the piers must be resistant to termites.

Conventional piers are made of metal. A tripod base comprises the major height of the pier. A vertically adjustable screw, typically mounted at the apex of the tripod base, is used to span the remaining distance. A major disadvantage of conventional piers is that overly extended screws fail by bending or braking out the top of the tripod mount. Therefore, the height of the apex of the pier should be close to the total height desired such that the screw is only slightly extended. Unless it is known beforehand that the site is flat and level, it cannot be known what length of piers to purchase or to bring to the site. Often, many more piers than a required a brought to the site to ensure sufficient piers correct length are at hand. The remaining piers must be returned. Also, as the ground settles and the pier height requires adjustment, piers near their maximum safe adjustment must be replaced.

Another problem arising out of conventional piers is that they are bulky and heavy. Consequently, space requirements are great and shipping and handling charges are high.

Therefore, there has been a need for a new pier, the major height of which is easily adjustable at the site.

It is further desirable that the major height-adjusting component be easily bought locally such that the major component need not be shipped.

It is also desirable that the height of the pier be easily adjustable over time without weakening the supporting ability.

These and other advantages are achieved in the disclosed invention.

SUMMARY OF THE INVENTION

This invention is a pier for supporting an object, such as the frame of a mobile home coach, above the ground and it generally comprises a support supporting a pipe in a vertical position and against downward movement, a platform having a sloped upper surface supported by the top end of the pipe, and a wedge supported by the platform; the wedge having a slanted bottom and a horizontal top surface for supporting the load The height of the pier can be adjusted by sliding the wedge up the sloped surface. Gripping ridges on the slope and wedge interact so that the wedge may not slide down the slope.

In a preferred embodiment, the platform includes a plurality of receptacles for receiving the top end of the pipe for supporting the sloped surface at various heights.

Other features and many attendant advantages of the invention will become more apparent upon a reading of the following detailed description together with the drawings in which like reference numerals refer to like parts throughout.

BRIEF DESCRIPTION OF THE DRAWING

FIG. 1 is a perspective view of a preferred embodiment of the pier of the invention.

FIG. 2 is an enlarged front elevation view of the pier of FIG. 1 adjusted to its minimum height.

FIG. 3 is a reduced top plan view of the pipe support of FIG. 2.

FIG. 4 is an enlarged side view of circle 4 of FIG. 2 showing the gripping teeth of the platform and wedge.

FIG. 5 is an enlarged exploded perspective view of the platform and wedge of FIG. 1.

FIG. 6 is an enlarged bottom plan view of the platform.

FIG. 7 is a sectional view taken on line 7—7 of FIG. 6.

FIG. 8 is a reduced front elevation view similar to FIG. 2 but with the pier adjusted to its maximum height.

DETAILED DESCRIPTION OF THE INVENTION

With reference now to the drawings, and more particularly to FIG. 1 thereof, there is shown a perspective view of a preferred embodiment of the pier, denoted generally as 10, of the invention. Pier 10 generally includes: a support, denoted generally as 80, vertically supporting a vertical support member, such as a pipe, denoted generally as 70; a platform, denoted generally as 30, supported by pipe 70; and a wedge, denoted generally as 50, supported by platform 30. In the preferred embodiment shown, platform 30 and wedge 50 are identically shaped, but this need not be so. The elements may be made of any suitable material. Preferably, all of the elements are made of plastic, such as ABS plastic.

Turning to FIGS. 2 and 3, FIG. 2 is an enlarged front elevation view of pier 10 of FIG. 1 and FIG. 3 is a top plan view of pipe support 80 of FIG. 2. Pipe 70 is shown foreshortened with the mid-section cut away. Pipe 70 includes a top end 71, a bottom end 78 and a side wall, such as outside wall 72 and inside wall 76. Preferably, pipe 70 is common ABS plastic pipe of four inch diameter such as is used in home plumbing and is readily available. Such pipe is may be bought in lengths, such as of eight, ten or twelve feet, and be easily cut to desired length for placement of each pier 10 at the site.

Pipe 70 is supported in a vertical position and against downward movement by support 80. Support 80 includes a base 82 for placement on a foundation, the ground or a pier pad. Base 82 includes fastening means, such as a plurality of through-bores 86 and a plurality of pin bores 87, for receiving fasteners for fastening support 80 to a foundation, the ground or a pier pad. Through-bores 86 could receive bolts or screw or the like and pin bores 87 may receive the upper end of pins (not shown), the bottom end of the pins being retained in a foundation or pier pad. The fasteners resist shear forces between support 80 and the foundation.

A wall 84, connected to base 82, supports a side wall of pipe 70. In the preferred embodiment, shown, wall 84 is in the form of a circular flange that supports outside wall 72 of pipe 70 such that pipe 70 is held in a vertical position. It can be seen that inside wall 76 could be supported similarly to achieve substantially the same result. Preferably, support wall 84 supports pipe side wall 72, 76 over a large area. In the preferred embodiment, wall 84 is a circular collar two to three inches high. Preferably, also, base 82 extends under and supports bottom end 78 of pipe 70 against downward movement. Base 82 distributes the downward force from pipe 70 over a larger area.

Platform 30 is supported by top end 71 of pipe 70. Preferably, platform 30 is wedge-shaped, having a horizontal bottom 37 and a top slope 43. The thickness of platform 30 between bottom 37 and slope 43 linearly varies from, in side view, thin end 33 to thick end 35. Bottom 37 is supported by pipe 70 and slope 43 is supported by bottom 37 by the side walls, end walls and internal structure. In the preferred embodiment, the internal structure 31 is of honeycomb design to lighten the weight and material used while still maintaining adequate strength.

FIG. 6 is an enlarged bottom plan view of the platform. FIG. 7 is a sectional view taken on line 7—7 of FIG. 6.

With reference also to FIGS. 6 and 7, bottom 37 includes a plurality of receptacles 40A, 40B, 40C, each for receiving top end 71 of pipe 70. Thin receptacle 40A is disposed toward thin end 33, thick receptacle 40C is disposed toward thick end 35 and medium receptacle 40B is disposed therebetween. Each receptacle includes means, such as a wall for bearing against the side wall of pipe 70 such that platform 30 cannot move horizontally relative to top end 71 of pipe 70. In the preferred embodiment, receptacles 40A–C are circular grooves each having an inside wall 41 for bearing against inside wall 76 of pipe 70 and an outside wall 42 for bearing against outside wall 72 of pipe 70. Because platform 30 of the preferred embodiment is made of a honeycomb construction, walls 41,42 bearing against pipe 70 are not continuous but exist only where the groove cuts through a construction member 31. If the grooves were cut in a solid platform, then the bearing walls would be continuous. It can be seen that the receptacles could be downward protruding flanges having walls bearing on the inside and/or outside walls of pipe 70.

Thin receptacle 40A is located near thin end 33 of platform 30. Supporting platform 30 on pipe 70 in thin receptacle 40A provides a first vertical distance from support pipe 70 to slope 43. Thick receptacle 40C is located near thick end 35 of platform 30 such that supporting platform 30 on pipe 70 in thick receptacle 40C provides a second vertical distance from pipe 70 to slope 43, the second vertical distance being greater than the first vertical distance. Medium receptacle 40B is located intermediary to thin receptacle 40A and thick receptacle 40C and the vertical distance from a pipe 70 therein to slope 43 is a distance between the first and second distances. As best seen in FIGS. 6 and 7, receptacles 40A–C may overlap one another.

Slope 43 of platform 30 is connected to and supported by bottom 37 and defines a slanted plane having an upward direction toward thick end 35 and a downward direction toward thin end 33. Preferably, slope 43 includes gripping means, such as ridges 45 for gripping wedge 50 placed thereon.

As best seen in FIG. 4, which is an enlarged side view of circle 4 of FIG. 2, griping means 45 of slope 43 is a plurality of horizontal ridges 45 having a tooth-shape in cross-section. A ridge 45 has a terminus 46, a face 47 and a back 48 that slants in the down-slope direction from its terminus 46. Preferably, face 47 is substantially vertical.

Wedge 50 is wedge-shaped, having on its bottom a slant 53 defining a plane parallel to and supported by slope 43, having a top 60 top defining a horizontal plane for supporting the coach frame and having a thin end 51 and a thick end 52. Top 60 is supported from slant 43 by the side walls, end walls and internal structure. Wedge 50 may be identical to platform 30, but need not be. The thickness of wedge 50 between slant 53 and top 60 linearly varies from, in side view, thin end 51 to thick end 52. The included angle between slant 53 and top 60 must equal the angle of slope 43 from the horizontal.

Returning one more to FIG. 4, slant 53 of wedge 50 includes gripping means, such as ridges 55 for gripping platform 30, preferably, for gripping interaction with the gripping means of platform 30 for preventing slant 53 from sliding down slope 43. Preferably, the gripping means of slant 53 includes a plurality of horizontal rows of teeth adapted to interact with the teeth of platform 30. In the preferred embodiment, the teeth are in the form of horizontal ridges 55 having a tooth-shape in cross-section. A ridge 55 has a terminus 56, a face 57 and a back 58 that slants in the up-slope direction from its terminus 56. Preferably, face 57 is substantially vertical. As seen in FIG. 4, slant 53 can slide up-ward on slope 43 but cannot slide downward.

The pier 10 of the invention greatly facilitates the supporting of a mobile home. There are two major methods of using the invention.

In the first method, the mobile home is already in position over the pier sites. For each pier 10 to be placed, there is a platform 30, a wedge 50, and a support 80. A supply of pipe 70 is available. The heights from the ground to the coach frame are measured and pipe is cut to length so that, with pipe 70 in thin receptacle 40A, wedge 50 can be inserted thin end first and slid up-slope to support the coach frame such pipe 70 is covered completely by wedge 50. This is the position shown in FIG. 2. If only a little ground settling is foreseen, such as if the ground is hard or if pier 10 is on a cement foundation, then a thicker receptacle may be used so long as the wedge covers the pipe.

As the ground settles, the height of pier 10 can be adjusted by tapping thick end 52 of wedge 50 to move slant 53 up slope 43. This method can be used until thick end 52 moves up-slope so far as to not cover pipe 70. Then pipe 70 must be moved to a thicker receptacle.

To move pipe 70 to a thicker receptacle, wedge 50 can be tapped from the side until it falls off slope 45. Pipe 70 can be moved to a thicker receptacle and wedge 50 can be reinserted.

FIG. 8 is a reduced front elevation view similar to FIG. 2 but with the pier 10 adjusted to substantially its maximum height. Further height adjustment, merely requires cutting a new longer length of pipe 70 to return to the thinnest wedge/platform setting as shown in FIG. 2.

In a second method of using the invention, the coach is not in position. Supports 80 with pipes 70 are buried in the ground with pipes 70 being extra long and protruding up to at least a support height for platforms 30. The pipes are all cut to define a horizontal plane for supporting the platforms 30. The coach is moved in position over the pipes and the platforms placed and wedges inserted as described above.

From the forgoing description, it can be seen that the pier of the invention offers many advantages over the prior art piers. On initial set up, pipe that is easily locally procured is used to provide for initial pier lengths so that a lot of piers of different lengths need not be carried to the set-up site. The pier of the invention is than easily height adjustable over a considerable range without a diminution in its strength.

Although a particular embodiment of the invention has been illustrated and described, various changes may be made in the form, composition, construction, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention.

We claim:

1. A pier for supporting an object at a desired height above a vertical support member having a top end and a side wall; said pier comprising:
   a platform supported by the top end of the vertical support member; said platform including:
      a bottom including:
         a plurality of receptacles; each said receptacle for receiving the top end of the vertical support member for supporting said platform thereon; each said receptacle including:
            a wall for bearing against the side wall of the vertical support member such that said platform cannot move horizontally relative to the top end of the vertical support member; and
      a top connected to and supported by said bottom of said platform; said top including:
         a slope defining a slanted plane; and
         gripping means for gripping a wedge; and
   a wedge including:
      a top defining a horizontal plane for supporting the object; and
      a bottom connected to and supporting said top of said wedge; said bottom of said wedge including:
         a slant defining a plane parallel to and supported by said slope, said slant being upwardly slidable on said slope such that the height of said top of said wedge is variable; and
         gripping means for gripping interaction with said gripping means of said platform for preventing said slant from sliding down said slope.

2. The pier of claim 1:
   said gripping means of said top of said platform includes:
      a plurality of horizontal rows of teeth on said slope; a said tooth of said platform having an terminus, a face and a back that slants in the down-slope direction from its terminus; and
   said gripping means of said wedge includes:
      a plurality of horizontal rows of teeth adapted to interact with said teeth of said platform; a said tooth of said wedge having a terminus, a face and a back that slants in the up-slant direction from its terminus.

3. The pier of claim 2:
   said faces of said platform teeth being substantially vertical.

4. The pier of claim 1:
   said gripping means of said top of said platform includes:
      a plurality of teeth; and
   said gripping means of said bottom of said wedge includes:
      a plurality of teeth adapted to interact with said teeth of said platform.

5. The pier of claim 1:
   said gripping means of said top of said platform includes:
      a plurality of horizontal rows of teeth on said slope; a said tooth of said platform having a terminus, a face and a back that slants in the down-slope direction from its terminus; and
   said gripping means of said wedge includes:
      a plurality of horizontal rows of teeth adapted to interact with said teeth of said platform.

6. The pier of claim 1:
   said plurality of receptacles including:
      a first receptacle disposed to receive the vertical support member at a first vertical distance from said slope; and
      a second receptacle disposed to receive the vertical support member at a second vertical distance from said slope; said second vertical distance differing from said first vertical distance.

7. A pier for supporting an object above the ground; said pier comprising:
   a vertical support member supported in a vertical position and against downward movement; said vertical support member including:
      a side wall
      a top end; and
      a bottom end;
   a platform supported by said top end of said vertical support member; said platform including:
      a bottom including:
         a plurality of receptacles; each said receptacle for receiving said top end of said vertical support member for supporting said platform thereon; each said receptacle including:
            a wall bearing against said side wall of said vertical support member such that said platform cannot move horizontally relative to said top end of said vertical support member; and
      a top connected to and supported by said bottom of said platform; said top including:
         a slope defining a slanted plane; and
         gripping means for gripping a wedge; and
   a wedge including:
      a top defining a horizontal plane for supporting the object; and
      a bottom connected to and supporting said top of said wedge; said bottom of said wedge including:
         a slant defining a plane parallel to and supported by said slope, said slant upwardly slidable on said slope such that the height of said top of said wedge is variable; and
         gripping means for gripping interaction with said gripping means of said platform for preventing said slant from sliding down said slope.

8. The pier of claim 7 further including:
   a support including:
      a base for placement on the ground; and
      a wall connected to said base and supporting said side wall of said vertical support member in a vertical position.

9. The pier of claim 7:
   said base of said support supporting said bottom end of said vertical support member against downward movement.

10. The pier of claim 8:
    said plurality of receptacles including:
    a first receptacle disposed to receive said vertical support member at a first vertical distance from said slope; and
    a second receptacle disposed to receive said vertical support member at a second vertical distance from said slope; said second vertical distance differing from said first vertical distance.

11. The pier of claim 7:
    said gripping means of said top of said platform includes:
       a plurality of teeth; and
    said gripping means of said bottom of said wedge includes:

a plurality of teeth adapted to interact with said teeth of said platform.

12. The pier of claim 7:

said gripping means of said top of said platform includes:
a plurality of horizontal rows of teeth on said slope; a said tooth of said platform having a terminus, a face and a back that slants in the down-slope direction from its terminus; and said gripping means of said wedge includes:
a plurality of horizontal rows of teeth adapted to interact with said teeth of said platform.

13. The pier of claim 7:

said gripping means of said top of said platform includes:
a plurality of horizontal rows of teeth on said slope; a said tooth of said platform having an terminus, a face and a back that slants in the down-slope direction from its terminus; and said gripping means of said wedge includes:
a plurality of horizontal rows of teeth adapted to interact with said teeth of said platform; a said tooth of said wedge having a terminus, a face and a back that slants in the up-slant direction from its terminus.

14. The pier of claim 13:

said faces of said platform teeth being substantially vertical.

15. A pier for supporting an object above the ground; said pier comprising:

a vertical support member supported in a vertical position and against downward movement; said vertical support member including:
a side wall
a top end; and
a bottom end;

a support including:
a base for placement on the ground; and
a wall connected to said base and supporting said side wall of said vertical support member in a vertical position;

a platform supported by said top end of said vertical support member.; said platform including:
a top including:
a slope defining a slanted plane; and
gripping means for gripping a wedge;
a bottom connected to and supporting said platform top; said bottom of said platform including:
a plurality of receptacles for receiving said top end of said vertical support member for supporting said platform thereon including:
a first receptacle disposed to receive said vertical support member at a first vertical distance from said slope; and
a second receptacle disposed to receive said vertical support member at a second vertical distance from said slope; said second vertical distance differing from said first vertical distance; each receptacle including:
a wall for bearing against said side wall of said vertical support member when said vertical support member is received in said receptacle such that said lower wedge cannot move horizontally relative to said top end of said vertical support member; and a wedge including:
a top defining a horizontal plane for supporting the object; and
a bottom connected to and supporting said top of said wedge; said bottom of said wedge including:
a slant defining a plane parallel to and supported by said slope, said slant upwardly slidable on said slope such that the height of said top of said wedge is variable; and
gripping means for gripping interaction with said gripping means of said platform for preventing said slant from sliding down said slope.

16. The pier of claim 15:

said gripping means of said top of said platform includes:
a plurality of teeth; and said gripping means of said bottom of said wedge includes:
a plurality of teeth adapted to interact with said teeth of said platform.

17. The pier of claim 15:

said gripping means of said top of said platform includes:
a plurality of horizontal rows of teeth on said slope; a said tooth of said platform having a terminus, a face and a back that slants in the down-slope direction from its terminus; and said gripping means of said wedge includes:
a plurality of horizontal rows of teeth adapted to interact with said teeth of said platform.

18. The pier of claim 17:

said faces of said platform teeth being substantially vertical.

* * * * *